United States Patent
Bhate et al.

(10) Patent No.: US 7,590,046 B1
(45) Date of Patent: Sep. 15, 2009

(54) PROTECTED SONET/SDH NETWORKS HAVING DELAYED FAULT PROPAGATION

(75) Inventors: Anuradha Bhate, Sunnyvale, CA (US); Sandeep Sidhu, San Jose, CA (US); Sidney Wright, Fremont, CA (US)

(73) Assignee: Ciena Corporation, Linthicum, MD (US)

( * ) Notice: Subject to any disclaimer, the term of this patent is extended or adjusted under 35 U.S.C. 154(b) by 686 days.

(21) Appl. No.: 10/902,035

(22) Filed: Jul. 30, 2004

Related U.S. Application Data (60) Provisional application No. 60/533,232, filed on Dec. 31, 2003.

(51) Int. Cl.
*H04L 12/26* (2006.01)

(52) U.S. Cl. ........................................ 370/216
(58) Field of Classification Search ................... 370/216
See application file for complete search history.

(56) References Cited

U.S. PATENT DOCUMENTS

| | | | | |
|---|---|---|---|---|
| 5,233,600 A * | 8/1993 | Pekarske | ..................... | 370/228 |
| 5,406,401 A * | 4/1995 | Kremer | ......................... | 398/4 |
| 6,268,808 B1 * | 7/2001 | Iryami et al. | ................... | 341/51 |
| 6,411,598 B1 * | 6/2002 | McGlade | ..................... | 370/217 |
| 6,609,840 B2 * | 8/2003 | Chow et al. | .................. | 398/102 |
| 7,447,157 B2 * | 11/2008 | Barker | ......................... | 370/242 |
| 2001/0012288 A1 * | 8/2001 | Yu | .............................. | 370/352 |
| 2002/0141332 A1 * | 10/2002 | Barnard et al. | .............. | 370/218 |
| 2003/0012204 A1 * | 1/2003 | Czeiger et al. | .............. | 370/401 |
| 2006/0126503 A1 * | 6/2006 | Huck et al. | .................. | 370/225 |

* cited by examiner

*Primary Examiner*—Edan Orgad
*Assistant Examiner*—Timothy J Weidner
(74) *Attorney, Agent, or Firm*—Clements Bernard PLLC; Christopher L. Bernard; Tyler S. Brown (57) ABSTRACT

A method and apparatus are disclosed for protecting a network having data networks, such as Fibre Channel, Ethernet, GbE and ESCON networks, and SONET/SDH transport networks. The method and apparatus protect the network from signaling or propagating alarms for temporary faults in the transport network. When a fault is detected, a timer counts up to a fault propagation delay period and a protection switch is initiated. A signal is also sent to the data network in place of the interrupted traffic in order to maintain the link. Before the timer reaches the fault propagation delay period, if the protection switch is successful, traffic is resumed over the restored path. If the timer reaches the fault propagation delay period and the protection switch is not successful, a data network fault propagation signal is sent to the data network. The removal of the fault condition is monitored, and normal traffic is allowed to flow to the data network when the fault condition is removed.

15 Claims, 5 Drawing Sheets

PROTECTED SONET/SDH NETWORKS HAVING DELAYED FAULT PROPAGATION

This Nonprovisional application claims priority under 35 U.S.C. § 119(a) on Patent Application No. 60/533,232 filed in United States of America on Dec. 31, 2003, the entire contents of which are hereby incorporated by reference.

BACKGROUND OF THE INVENTION

1. Field of the Invention

The present invention relates to the transfer of data, such as Fibre Channel, GbE (Gigabit Ethernet), Ethernet or ESCON (Enterprise System Connection) data, across SONET/SDH (Synchronous Optical Network/Synchronous Digital Hierarchy) transport networks, and more particularly to the transfer of data across such transport networks without unnecessarily signaling or propagating alarms for temporary faults.

2. Discussion of the Relevant Art

Modern communication networks are comprised of data networks and transport networks that transmit data formatted according to different protocols or standards. For example, data networks may transmit data using the Fibre Channel, GbE, Ethernet or ESCON standards. Optical transport networks may typically use either the SONET or SDH standards.

The SONET standard is an American National Standards Institute standard for synchronous data transmission on optical media. The international equivalent of the SONET standard is the synchronous digital hierarchy (SDH) standard, developed by the International Telecommunications Union (ITU). These two standards ensure that digital networks can interconnect internationally and that existing conventional transmission systems can take advantage of optical media through tributary attachments. SONET provides standards for a number of line rates up to the maximum line rate of 9.953 gigabits per second (Gps). Actual line rates approaching 20 gigabits per second are possible. SONET is considered to be the foundation for the physical layer of the broadband ISDN (Integrated Services Digital Network). SONET/SDH networks transport data to data networks such as Ethernet, GbE, Fibre Channel, Escon etc.

Ethernet is probably the most popular local area network technology. Ethernet, which is included in the IEEE 802.3, standard was originally developed by Xerox from an earlier specification called *Alohanet* (for the Palo Alto Research Center Aloha network). Other corporations including DEC and Intel have contributed to the development of Ethernet. An Ethernet LAN typically uses coaxial cable or special grades of twisted pair wires. Ethernet may also be used in wireless LANs. The most commonly installed Ethernet systems are called 10BASE-T and provide transmission speeds up to 10 Mbps. Devices are connected to the cable and compete for access using a Carrier Sense Multiple Access with Collision Detection (CSMA/CD) protocol. Fast Ethernet or 100BASE-T provides transmission speeds up to 100 megabits per second and is typically used for LAN backbone systems, supporting workstations with 10BASE-T cards.

Gigabit Ethernet provides an even higher level of backbone support at 1000 megabits per second (1 gigabit or 1 billion bits per second), and 10-Gigabit Ethernet provides up to 10 billion bits per second. Gigabit Ethernet is based on the same Ethernet frame format and protocol used in local area networks (LANs). Gigabit Ethernet is also defined in the IEEE 802.3 standard, and it is often used as the backbone in many enterprise networks. Gigabit Ethernet is carried primarily on optical fiber (with very short distances possible on copper media). Existing Ethernet LANs with 10 and 100 Mbps cards can feed into a Gigabit Ethernet backbone. A newer standard, 10-Gigabit Ethernet, is becoming available.

Fibre Channel is a technology for transmitting data between computer devices at data rates of up to 1 or 2 Gps and possibly even 10 Gbps in the future. Fibre Channel is well suited for connecting computer servers to shared storage devices and for interconnecting storage controllers and drives. Since Fibre Channel is three times as fast, it has begun to replace the Small Computer System Interface (SCSI) as the transmission interface between servers and clustered storage devices. Fibre channel is more flexible, and devices can be as far as ten kilometers (about six miles) apart if optical fiber is used as the physical medium. Optical fiber is not required for shorter distances, however, because Fibre Channel also works using coaxial cable and ordinary telephone twisted pair.

ESCON (Enterprise Systems Connection) is a marketing name for a set of IBM and vendor products that interconnect S/390 computers with each other and with attached storage, locally attached workstations, and other devices using optical fiber technology and dynamically modifiable switches called ESCON directors. In IBM mainframes, the local interconnection of hardware units is known as channel connection (and sometimes as local connection to distinguish it from remote or telecommunication connection). ESCON's fiber optic cabling can extend this local-to-the-mainframe network up to 60 kilometers (37.3 miles) with chained directors. The data rate on the link itself is up to 200 Mbps (million bits per second) and somewhat less when adapted to the channel interface. Vendor enhancements may provide additional distance and higher amounts of throughput to an ESCON network.

Figure 1:
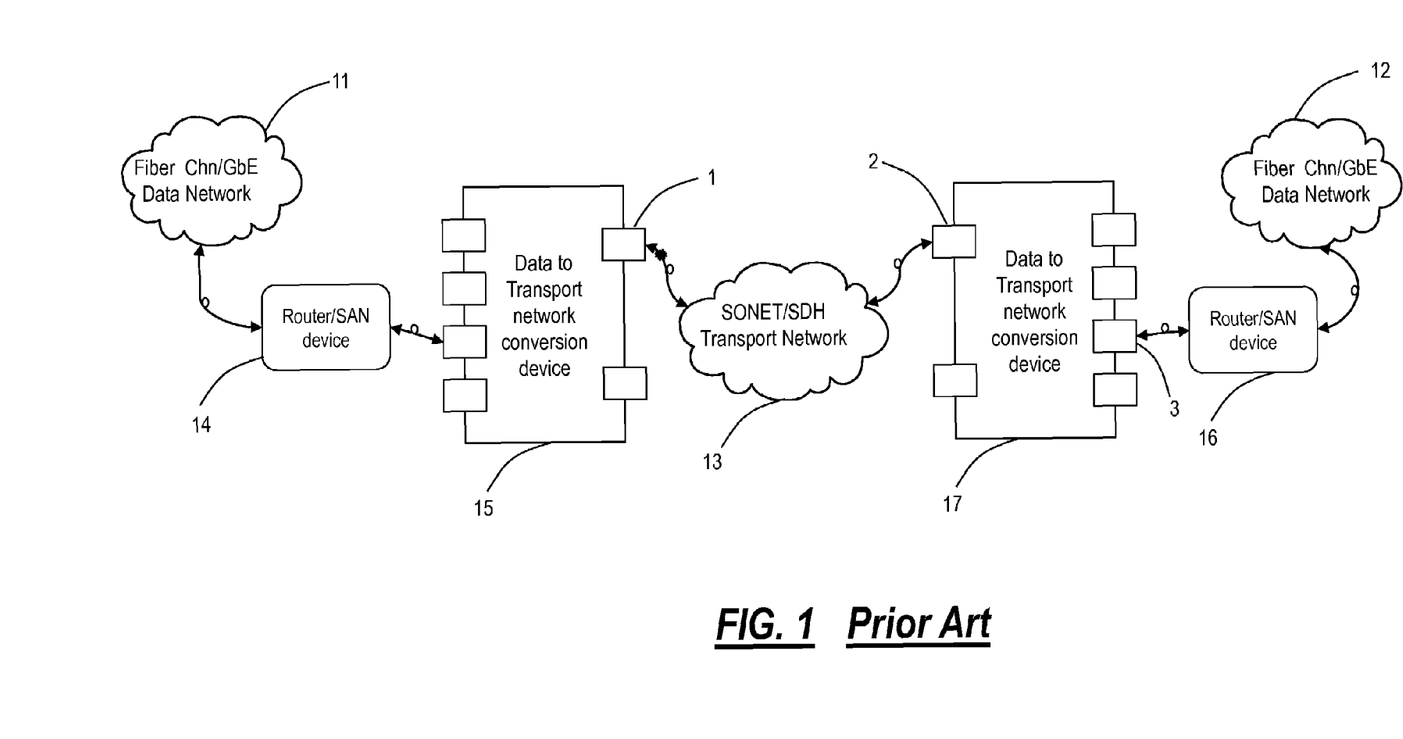
FIG. 1 is an illustration of a plurality of data networks coupled to an unprotected optical transport network.

Referring now to FIG. 1, a first data network 11 and second data network 12 are illustrated as being coupled together via an optical transport network 13, such as a SONET or SDH network. The first data network 11, which could include a Fibre Channel, Ethernet, GbE or ESCON data network is coupled to the SONET/SDH transport network 13 via a router/SAN device 14 and a data to transport network conversion device 15. A SAN (storage area network) data gateway router is a hardware solution that enables the attachment of SCSI storage systems to Fibre Channel adapters on specific Intel-based servers running Windows NT and UNIX-based servers from IBM and Sun Microsystems. An example of such a device is the IBM SAN Data Gateway Router 2108-R03. Likewise, the second data network 12, which could also include a Fibre Channel, Ethernet, GbE or ESCON data network is coupled to the optical transport network 13 via a router/SAN device 16 and a data to transport network conversion device 17.

In a conventional network, a fault can occur at an output 1 of the data to transport network conversion device 15. The fault could include a fiber break, a loss of frame (LOF), a loss of signal (LOS), etc. The fault would be detected at the SONET/SDH transport network port 2 of the data to transport network conversion device 17. A signal would then be propagated from the port 3 of the data to transport network conversion device 17. The signal could indicate a fault, such as laser shutoff, NOS (network operating system) problem, OLS (optical label switching) problem, etc. The router/SAN (System Area Network) device 16 would then signal a link down condition to the second data network 12.

If such a scenario occurs, the transport of Fibre Channel, Escon, Ethernet or GbE data across the SONET/SDH network 13 requires translation of SONET/SDH network defects/alarms into Fiber Channel and Ethernet defects/alarms. This translation allows the router/SAN device 16 and/or the Fiber Channel and Ethernet network 12 to process the SONET/SDH defect/alarm as if it occurred in the data realm. When the SONET/SDH network 13 is totally unprotected, this translation may occur instantaneously. However, if the SONET/SDH network 13 is protected, for example, using a BLSR SONET protection scheme, the error may not be corrected fast enough before the defect/alarm translation occurs. During this switching time, if the temporary error is translated to the data network 12, a link down condition may be signaled and propagated throughout the data network 12, negating the fast restoration of the SONET/SDH network 13. Accordingly, there is a need to prevent relatively brief and correctable faults in the SONET/SDH network 13 from being signaled and propagated throughout the data network 12. One solution might include a built-in delay for each router/SAN device connected to the SONET/SDH transport network. However this delay would be used in all cases, including SONET/SDH unprotected and protected scenarios.

Several vendors sell products that allow the transport of Ethernet data over a SONET/SDH line. One such product is the Riverstone RS 38000 router, but these systems do not provide a flexible delay of fault propagation to allow for proper interoperation of the data and transport networks. In such schemes, a hold-off timer in a router/SAN device may be used when there are overlapping protection schemes. This generically will cause, for example, a router/SAN device to hold-off its fault acknowledgement and processing logic when detecting any fault. This will allow an optical network's protection switch to complete, but it is not a satisfactory solution.

Accordingly, there is a need for a technique that introduces a dynamic delay in the SONET/SDH network allowing it to only be applied in the SONET/SDH protected network scenario and centralizing the configuration of the delay for all connected data networks.

DETAILED DESCRIPTION OF THE INVENTION

In order to facilitate an understanding of the present invention, an identification of the following list of acronyms is provided.
BLSR—Bidirectional Line Switched Ring
CONFIG—Configuration
CSMA/CD—Carrier Sense Multiple Access with Collision Detection
Demux—Demultiplexer
DWDM—Dense Wavelength Division Multiplexing
EMUX—Electrical multiplexer
ESCON—Enterprise System Connection
FC—Fibre Channel
FIFO—First In First Out
FPGA—Field Programmable Gate Array
GbE—Gigabit Ethernet
Gps—Gigabits per second
GRDM—Gigabit Rate Data Mux
IEEE—Institute of Electrical and Electronics Engineers
ISDN—Integrated Services Digital Network
ITU—International Telecommunications Union
K28.5—Primitive signal ordered set for IDLE
K30.7—Primitive signal ordered set for ERROR
LAN—Local area network
LOF—Loss Of Frame
LOS—Loss Of Signal
LR—Primitive Signal ordered set for Link Reset
LRR—Primitive signal ordered set for Link Reset Response
Mbps—Million bits per second
Ms—milliseconds
Mux—Multiplexer
Nm—nanometer
NOS—Primitive signal ordered set for Not Operational Signal
OC-48C/STM-16—SONET Optical Carrier 48: 2.4Gbs/SDH Synchronous
Transport Module 16: 2.4 Gbs
OLS—Primitive sequence ordered set for Offline State
PHY—Physical Layer chip
Rx—Receiver
SAN—Storage Area Network
SCSI—Small Computer System Interface
SFDADM—SONET-Framed Data Add/Drop Multiplexer
SONET/SDH—Synchronous Optical Network/Synchronous Digital Hierarchy
SPE—SONET Payload Envelope
UPSR—Uni-directional Path Switched Ring
WCI—Wavelength converter interface In an embodiment of the present invention, a SONET/SDH transport network is provided with a sufficient delay prior to the initiation of the fault propagation in order to allow itself to switch. This process interoperates with the data networks ability to detect a link down condition, by automatically sending IDLE pattern signals to the data network, maintaining the link up condition.

The present invention solves a problem with data networks that may detect a link down condition faster than a SONET/SDH networks ability to perform a protection switch. For example, if a data network can detect a failure condition within 10 ms, then during a SONET/SDH network protection switch of 50 ms, the data network will detect a fault condition and initiate Link Down signals to the downstream network. To propagate this Link Down, to detect the restoration of the traffic path and then to propagate Link Up may take a period of time greater than 1 minute, although the traffic path may be restored in as little as 50 ms.

Figure 2:
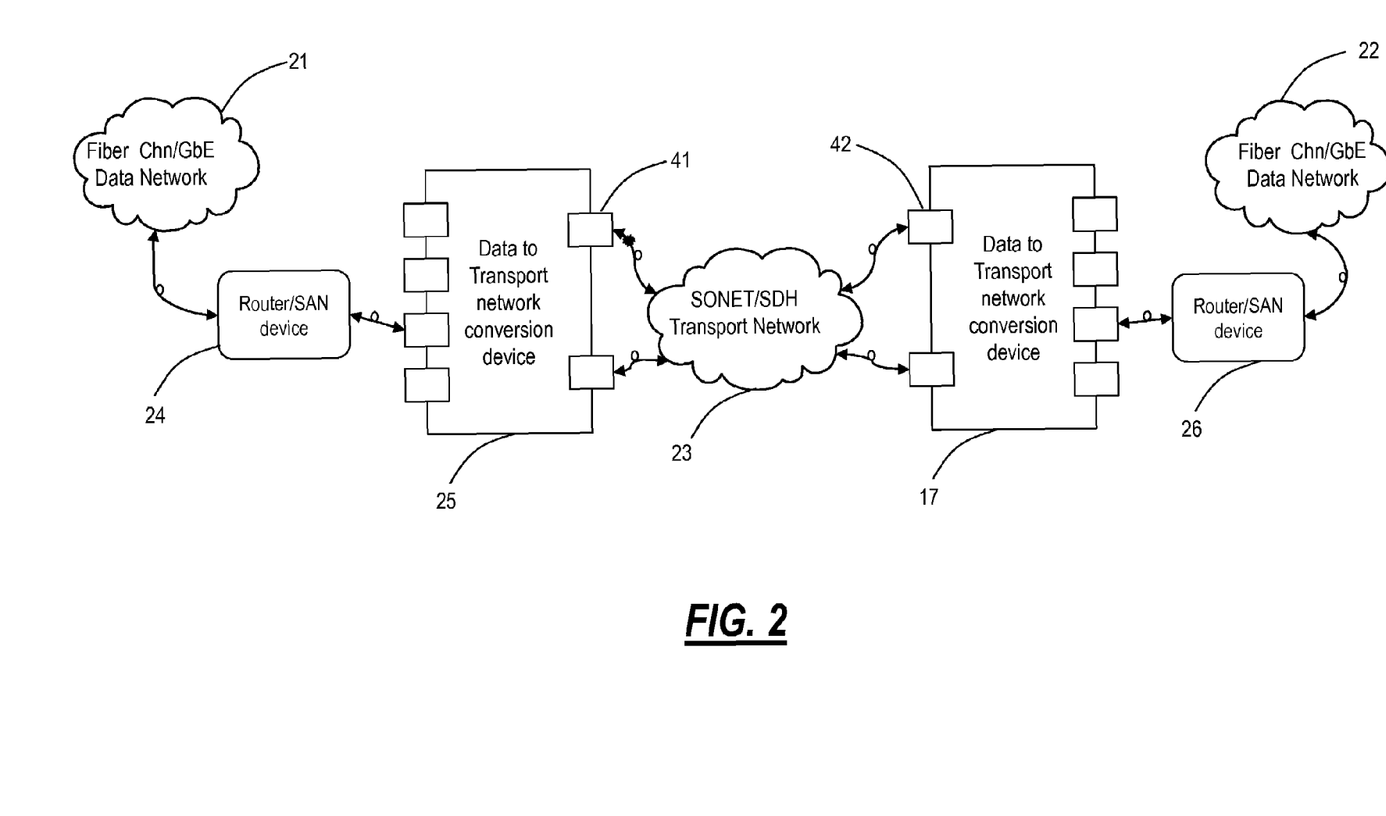
FIG. 2 is an illustration of a plurality of data networks coupled to a protected optical transport network utilizing the method and apparatus of the present invention.

Referring now to FIG. 2, a diagram illustrates a first data network 21 and second data network 22 that are coupled together via an optical transport network 23. The diagram will be utilized to describe an apparatus consistent with an embodiment of the present invention. The first data network 21, which could include a Fibre Channel, Ethernet, GbE or ESCON network is coupled to the SONET/SDH transport network 23 via a router/SAN device 24 and a data to transport network conversion device 25. Likewise, the second data network 22, which could also include a Fibre Channel, Ethernet, GbE or ESCON network is coupled the SONET/SDH transport network 23 via a router/SAN device 26 and a data to transport network conversion device 27.

Figure 4:
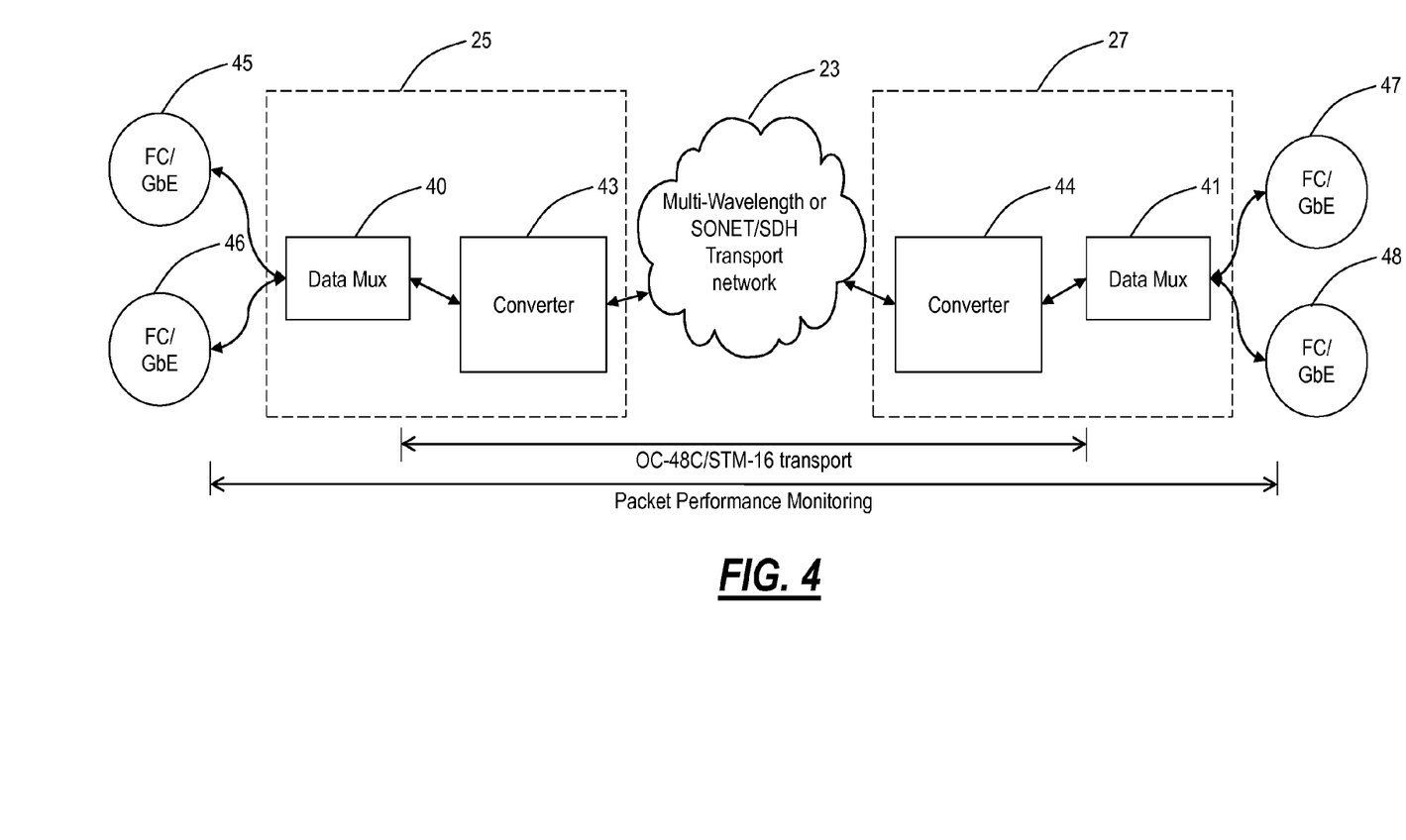
FIG. 4 is a more detailed illustration of the data networks of FIG. 3.

Referring now to FIG. 4, a block diagram provides a more detailed illustration of the data to transport network conversion devices 25, 27 of FIG. 2. In FIG. 4, it can be seen that both the transport network conversion devices 25, 27 include data multiplexers 40, 41 and optional converters 43, 44, respectively. The inputs/outputs to the data multiplexers 40, 41 are illustrated as the Fibre Channel/Gigabit Ethernet interfaces 45-48 that are connected to the routers/SAN devices 14, 16. The two streams entering the data multiplexers 40, 41 are muxltipled together and output from the data multiplexers 40, 41 as one SONET OC-48C/STM-16 transport. This transport could be in the form of a 1310 nm or DWDM wavelength output from the data multiplexer 40. If a 1310 nm wavelength is output, then the converters 43, 44 could include a separate WCI (wavelength converter interface). The converters 43, 44 could also include in a DWDM filter or switch. The converter 43, 44 may be used as transponders which accepts the 1310 nm SONET/SDH signals from the data multiplexers 41, 40 and converts them to one of the standard ITU grid wavelengths for transport in a typical DWDM multi-wavelength transport system 23. FIG. 4 is intended to illustrate a typical usage of the data multiplexers 40, 41 in either a SONET or multi-wavelength DWDM network 23.

Figure 5:
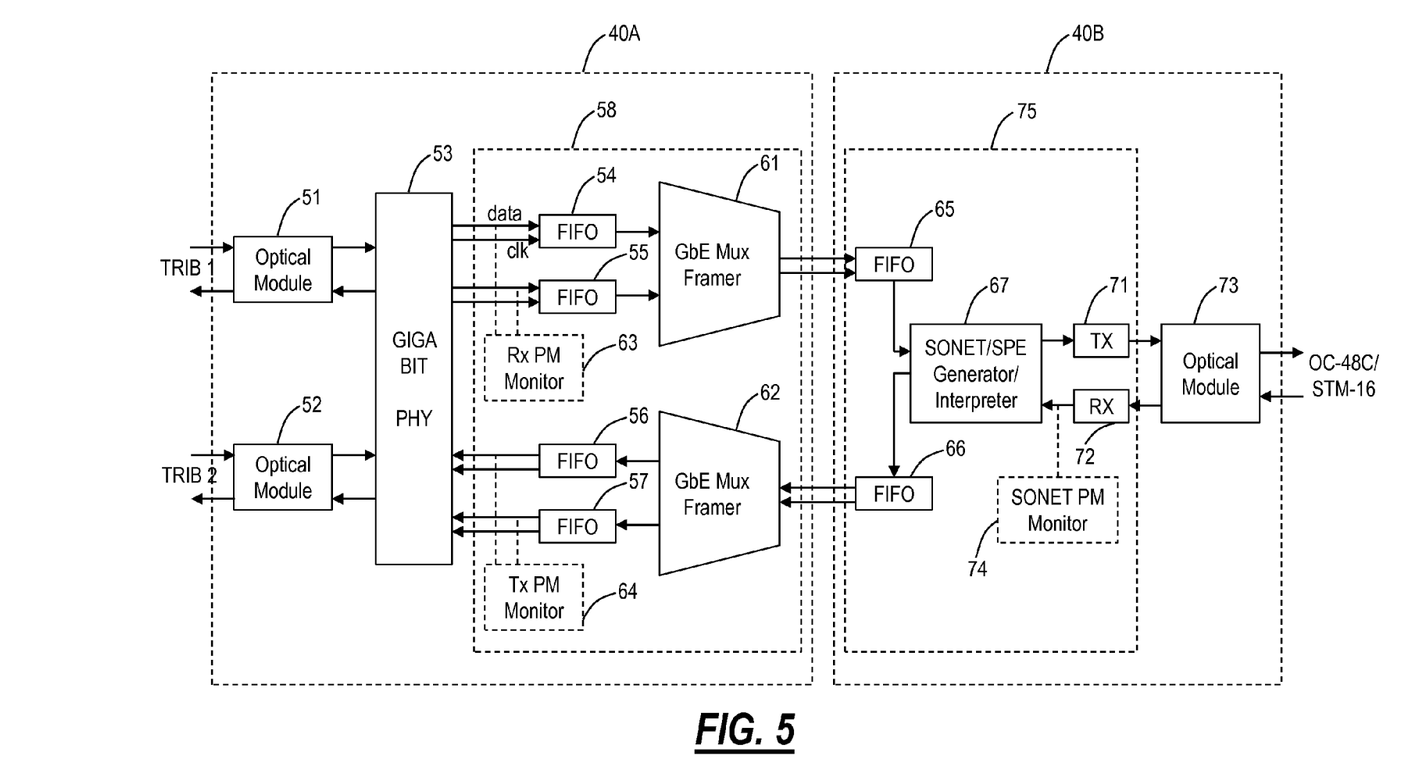
FIG. 5 is block diagram of the data multiplexer and converter of FIG. 4.

Referring now to FIG. 5, a block diagram provides a more detailed illustration of the data multiplexer 40 which includes data multiplexer framer 40A and datamultiplexer mapper 40B. The multiplexer 40 is connected to the router/SAN device 24 via two streams or tributaries TRIB 1, TRIB 2. The data multiplexer framer 40A includes optical module 51, 52 that provide an integrated optical to electrical conversion. The optical modules 51, 52 are coupled to a PHY device 53 that provides physical layer functions, including clock recovery, serializing/deserializing, loopback implementation, 8b/10b encoding/decoding for GbE. All packet/words are transported unaltered through the PHY device 53 and applied to a FPGA (field programmable gate array) 58.

The FPGA 58 includes a plurality of FIFO devices 54-57 and framers 61, 62. The FIFO devices 54-57 absorb any discontinuity in the input/output for a sub-2 microsecond delay. The combination of framer logic and a FIFO controller act as a timer within the frame builder FPGA block 58 to delay the propagation of a fault through the FPGA. A counter (non shown) which may be set to 0 ms, 60 ms, 120 ms or 180 ms is used to allow the FIFO controller to delay the fault message traversing from the framer 62 to the PHY device 53. During the delay period, the framer 62 within the frame builder FPGA block 58 transmits IDLE patterns to the PHY device 53 to maintain the link up state with the equipment connected to the tributaries 1, 2. The FPGA block 58 preferably includes performance monitoring blocks 63, 64 that provide non-intrusive monitoring of both the Rx and Tx transport paths. The GbE mux/demux framer 61 performs rate adaptation, mapping of the two tributary channels into one frame and error injection for diagnostics. The rate adaptation is performed through IDLE, CONFIG, K30.7, OLS, NOS, LR and LRR ordered set insertion/deletion.

The input/output of the data multiplexer framer 40A is coupled to a SONET/SDH direct mapper 75 within the data multiplexer mapper 43. The SONET/SDH direct mapper 75 includes FIFO devices 65, 66 for either applying or receiving the input/output of the data multiplexer framer 40A. The FIFO devices 65, 66 are coupled to a SONET SPE generator/interpreter 67. The SONET SPE generator/interpreter 67 performs two functions. The first function is to generate the proper SPE for standard SONET transport for the transmitted signal applied to transmitter 71. The second function is to interpret the SONET pointer alignment for the received signal from receiver 72. The SONET/SDH direct mapper 75 also includes a monitor 74. The signal from the transmitter 71 or the signal received by receiver 72 are converted from electrical to optical or optical to electrical with the optical module 73. The input/output of the optical module 73 are in the form of OC-48C/STM-16 signals.

Figure 3:
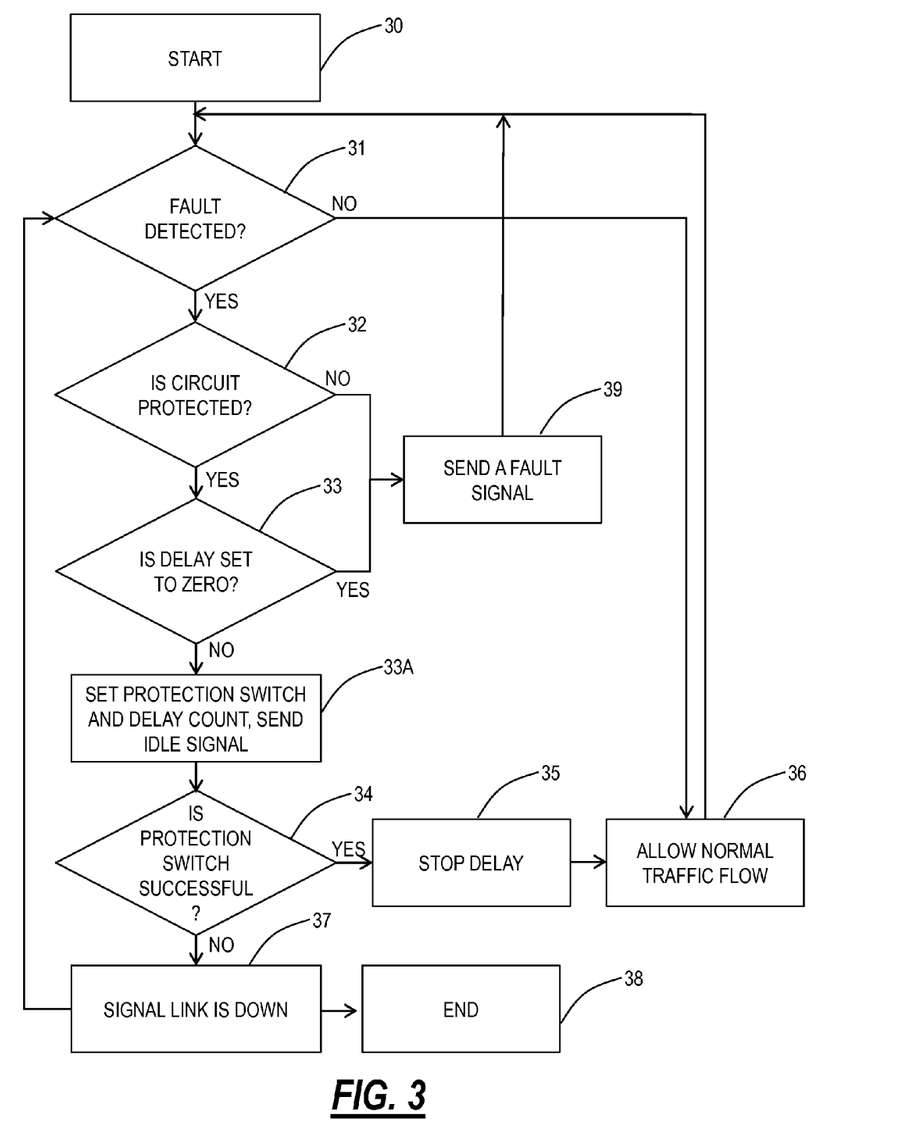
FIG. 3 is a flow diagram depicting the method of the present invention.

Referring now to FIG. 3, the method of the present invention will now be described. In step 30, the method starts, and in step 31 the system detects faults. If a fault occurs at the output 41 of the data to transport network conversion device 25, then a determination is made in step 32 whether the circuit is protected. If the circuit is not protected, a fault signal is sent in step 39. Such a fault could include a fiber break, a loss of frame (LOF), a loss of signal (LOS), etc., and the fault would be detected at the SONET/SDH transport network port 42 of the data to transport network conversion device 27. If it is determined in step 32 that the SONET/SDH transport network is protected, then it is determined in step 33 whether the delay is set to zero. If the delay is set to zero, then a fault signal is immediately sent. Otherwise the delay count is set and an IDLE pattern is generated and sent to the data network 22 to maintain the link. If it is determined in step 34, that the protection switch is successful, the delay period count is stopped in step 35 and normal traffic is allowed to flow in step 36. If the protect switch is unsuccessful in step 34 and the delay period has passed, a signal is generated in step 37 which would then be used to propagate the fault or alarm signal to the data network indicating a laser shutoff, K30.7, NOS, OLS, etc. The router/SAN device 26 would then signal a link down condition to the second data network 22.

The method and apparatus of the present invention, therefore, allows the transport network 23 to be aware of an in-progress SONET/SDH protection switch, and to delay the user-provisioned fault translation to the Fibre Channel or Ethernet networks in delayed periods of time. When a condition is detected at the SONET/SDH line port that initiates a protection switch on the GRDM (Gigabit Rate Data Mux), SFDADM (SONET-Framed Data Add/Drop Multiplexer) or EMUX (electrical multiplexer) circuit packs, the fault propagation mode and fault propagation delay are read. The fault propagation delay may preferably be set to a value of 0 ms, 60 ms, 120 ms or 180 ms. A delay value of "0" will cause the fault propagation mode setting to immediately be sent at the tributary port, essentially disabling the delay. A delay value other than zero will wait for the specified number of milliseconds before sending the fault propagation mode signal at the tributary port. The values of 60 ms, 120 ms and 180 ms are significant for the interoperation of SONET/SDH networks and data networks such as Ethernet or Fibre Channel. The 60 ms value allows for a delay to extend past the typical 50 ms SONET/SDH network switch time. Values of 120 ms and 180 ms allows for a delay to extend past the large SONET/SDH switch time criteria of 100 ms.

While waiting for the delay period to expire, IDLE patterns are generated by default to maintain the link. The fault propagation mode after can be set to (K30.7, Laser Shut-off, NOS, OLS or user-provisionable). The present invention may also include a user-provisionable aspect that is unique, wherein it allows a user to define their own ordered set to use for fault propagation, independent of the standard ordered sets such as K30.7 and K28.5.

Preferably, when utilizing the present invention and setting up a data service to be transported over a SONET/SDH transport network, three parameters are utilized. These parameters include a SONET/SDH Transport Network Protection Mode (unprotected, BLSR, UPSR, 1+1, 1:1). The parameters also include a Data Network Fault Propagation Signal (Laser shut-off, K30.7, NOS, OLS, user configurable). Lastly they include a fault propagation delay of a predetermined time (0 ms, 60 ms, 120 ms, 180 ms).

An advantage of the present invention is that it includes a method to allow a device which translates data network protocols into a SONET/SDH transport network, to interwork the transport networks protection switching mechanism and fault propagation into the data network.

Another advantage of the present invention is that it allows for the transport network to perform protection switching without initiating a link down signal in the data network. Accordingly, the present invention provides a minimal disruption to data network service, and it allows the data network to continue to discover faults within 10 ms.

A further advantage of the present invention is that it also preferably includes a "user-provisionable" option for a fault propagation signal. This allows a user to program their own ordered set to be transmitted to the data network, when an error occurs in the transport network.

Another further advantage of the present invention is that it does not require the overlay network to implement a hold-off timer. Instead the transport network that the "overlay network" utilizes provides a sufficient delay in the notification to allow itself to switch.

What is claimed is:

1. A method for protecting a network having at least one data network and at least one transport network, which comprises the steps of:
    setting up the at least one data network to be transported over the at least one transport network comprising a SONET/SDH network, wherein setting up comprises determining a SONET/SDH Network Protection Mode comprising one of unprotected, BLSR, UPSR, 1+1, and 1:1, determining a Data Network Propagation Signal comprising one of Laser shutoff, K30.7, NOS, OLS, and user configurable, and determining a fault propagation delay period responsive to interoperation of the at least one data network and the at least one transport network, wherein the data network is selected from the group of networks comprising Fibre Channel networks, Ethernet networks, GbE networks and ESCON networks;
    operating the at least one data network over the at least one transport network, wherein the at least one data network connects to the at least one transport network through a conversion device comprising a data multiplexer and a converter, wherein the conversion device is configured to multiplex signals from the at least one data network into a concatenated SONET/SDH signal;
    detecting a fault in the at least one transport network;
    beginning a timer that counts up to the fault propagation delay period, when the fault is detected;
    initiating a protection switch in the at least one transport network;
    sending a signal to the data network in place of interrupted traffic to maintain a link thereby allowing the protection switch to correct the fault;
    determining, before the timer reaches the fault propagation delay period, whether the protection switch is successful, and if successful, resuming traffic over a restored path; and
    sending a data network fault propagation signal to the data network, if the timer reaches the fault propagation delay period and the protection switch is not successful.

2. A method according to claim 1 wherein the conversion device further comprises an optical interface configured to transmit over the at least one transport network at one of a 1310 nm wavelength and a DWDM wavelength.

3. A method according to claim 1 wherein the fault propagation delay period has a range of values from approximately 50 ms to 180 ms.

4. A method according to claim 1 which further includes the step of monitoring for a fault condition to be removed and allowing normal traffic to flow to the data network when the fault condition is removed.

5. A method according to claim 1 wherein the detected fault comprises an ordered set of faults.

6. A method according to claim 5 wherein the order set of faults is user-definable independent of standard ordered sets.

7. A method according to claim 1 wherein the data multiplexer comprises:
    optical input modules;
    a PHY device providing physical layer functions comprising clock recovery, serializing/deserializing, loopback implementation, and 8b/10b encoding/decoding for Ethernet;
    a field programmable gate array comprising a plurality of FIFO devices, framers, and a combination of framer logic and a FIFO controller configured to operate the timer;
    a SONET/SDH direct mapper comprising FIFO devices and a SONET SPE generator/interpreter; and
    optical output modules.

8. A method according to claim 1 wherein the converter comprises a transponder comprising a wavelength converter.

9. A network protection device for a data network coupled to a transport network, comprising:
    optical input modules connected to the data network, wherein the data network is selected from the group of networks comprising Fibre Channel networks, Ethernet networks, GbE networks and ESCON networks, and wherein the data network is operated over the transport network;
    a PHY device providing physical layer functions comprising clock recovery, serializing/deserializing, loopback implementation, and 8b/10b encoding/decoding for Ethernet;
    a field programmable gate array comprising a plurality of FIFO devices, framers, and a combination of framer logic and a FIFO controller configured to operate a timer;
    a SONET/SDH direct mapper comprising FIFO devices and a SONET SPE generator/interpreter;
    a detector for detecting a fault in the transport network, wherein a protection switch in the transport network comprising any of BLSR, UPSR, 1+1, and 1:1 protection is initiated responsive to detecting the fault;
    wherein the timer, responsive to the detector, counts up to a fault propagation delay period, when a fault is detected;
    a logic device for determining, before the timer reaches the fault propagation delay period, whether the protection switch is successful; and
    a signal generator for sending an idle signal in place of interrupted traffic, if the protection switch is successful, and for sending a data network fault propagation signal to the data network, if the timer reaches the fault propagation delay period and the protection switch is not successful;
    optical output modules connected to the transport network configured to transmit a concatenated SONET/SDH signal comprising signals from the data network;
    wherein the network protection device is configured with three parameters utilized for transporting signals over the data network and the transport network, wherein the three parameters comprise a SONET/SDH Network Protection Mode comprising one of unprotected, BLSR, UPSR, 1+1, and 1:1, a Data Network Fault Propagation Signal comprising one of Laser shutoff, K30.7, NOS, OLS, and user configurable, and the fault propagation delay period that is set responsive to interoperation of the data network and the transport network.

10. A network protection device according to claim 9 wherein the optical output modules are configured to transmit over the transport network at one of a 1310 nm wavelength and a DWDM wavelength.

11. A network protection device according to claim 9 wherein the data network is coupled to the transport network via a router/SAN device and a data to transport network conversion device.

12. A method for protecting a network having at least one data network and at least one transport network, which comprises the steps of:

setting up the at least one data network to be transported over the at least one transport network comprising a SONET/SDH network, wherein setting up comprises determining a SONET/SDH Network Protection Mode comprising one of unprotected, BLSR, UPSR, 1+1, and 1:1, determining a Data Network Fault Propagation Signal comprising one of Laser shutoff K30.7, NOS, OLS, and user configurable, and determining a fault propagation delay period responsive to interoperation of the at least one data network and the at least one transport network, wherein the data network is selected from the group of networks comprising Fibre Channel networks, Ethernet networks, GbE networks and ESCON networks;

operating the at least one data network over the at least one transport network, wherein the at least one data network connects to the at least one transport network through a conversion device comprising a data multiplexer and a converter, wherein the conversion device is configured to multiplex signals from the at least one data network into a concatenated SONET/SDH signal;

detecting whether a fault has occurred in the transport network, wherein the fault comprises an ordered set of faults, and wherein the order set of faults is user-definable independent of standard ordered sets;

determining whether the transport network includes a protection mode responsive to the SONET/SDH Network Protection Mode, and when no protection mode is provided, sending a fault signal is a fault occurs, and initiating a protection mode, if a protection mode is provided; said protection mode comprising:

beginning a timer that counts up tot he fault propagation delay period;

initiating a protection switch in the transport network;

sending a signal to the data network in place of interrupted traffic to maintain a link;

determining, before the timer reaches the fault propagation delay period, whether the protection switch is successful, and if successful, resuming traffic over a restored path; and         sending a data network fault propagation signal to the data network, if the timer reaches the fault propagation delay period and the protection switch is not successful.

13. A method according to claim 12 which further includes the step of monitoring for a fault condition to be removed and allowing normal traffic to flow to the data network when the fault condition is removed.

14. A method according to claim 12 wherein the data multiplexer comprises:

optical input modules;

a PHY device providing physical layer functions comprising clock recovery, serializing/deserializing, loopback implementation, and 8b/10b encoding/decoding for Ethernet;

a field programmable gate array comprising a plurality of FIFO devices, framers, and a combination of framer logic and a FIFO controller configured to operate the timer;

a SONET/SDH direct mapper comprising FIFO devices and a SONET SPE generator/interpreter; and     optical output modules.

15. A method according to claim 12 wherein the converter comprises a transponder comprising a wavelength converter.

* * * * *